US006437802B1

(12) United States Patent
Kenny

(10) Patent No.: US 6,437,802 B1
(45) Date of Patent: Aug. 20, 2002

(54) THROTTLER FOR RAPID START-UP OF A BROADCAST AUTOMATION SYSTEM

(75) Inventor: Kevin Bernard Kenny, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/352,089

(22) Filed: Jul. 14, 1999

(51) Int. Cl.[7] .................................................. G06F 17/00
(52) U.S. Cl. .......................................... 345/723; 725/50
(58) Field of Search ................................. 345/806, 807, 345/716, 723, 762; 725/50, 51, 52, 53, 54

(56) References Cited

U.S. PATENT DOCUMENTS 5,801,685 A * 9/1998 Miller et al. ................ 345/806
6,091,407 A * 7/2000 Boetje et al. ............... 345/716
6,209,130 B1 * 3/2001 Rector, Jr. et al. ............ 725/50

* cited by examiner

*Primary Examiner*—Cao H. Nguyen
(74) *Attorney, Agent, or Firm*—David C. Goldman; Jill M. Breedlove

(57) ABSTRACT

A throttler method for rapid start-up for use with broadcast automation systems. A throttler loads an initial playlist while also accepting editing commands. The throttler interleaves these events and commands and generates and modifies the playlist of scheduled events. The throttler sends the events to a broadcast automation system for execution which drives audio and video devices based on the scheduled events, allowing the editing commands to be interleaved with non-editing commands. For unprocessed editing command, a command pair of up to two pieces of information are maintained: one deletion command and one insertion command. Each command, or event, has a unique "event identifier" and is hashed into a rapidly accessible priority queue table, according to urgency.

15 Claims, 7 Drawing Sheets

Hash table mapping event identifiers to the addresses of queue elements

Priority queue of pairs of editing commands

THROTTLER FOR RAPID START-UP OF A BROADCAST AUTOMATION SYSTEM

FIELD OF THE INVENTION

This invention relates to broadcast automation systems, and more particularly to a method for rapid start-up for these systems.

BACKGROUND OF THE INVENTION

Present-day broadcast automation systems generally work on the concept of a "playlist", also known as a schedule of events. These events are commands to video devices to play pieces of audio/visual material, insert special effects, acquire video from a particular input device, direct video to particular output devices, and other activities related to audio/video broadcasting.

Broadcast automation systems operate by loading the events of an entire playlist sequentially, all at once. While the playlist is loading, the system is unavailable for other processing while this initial playlist is loading. While the system can subsequently accept changes, called "edits" to the playlist, the processing of edits is limited. A large number of edits in rapid succession can make the systems unavailable while the edits are being processed. Moreover, edits to events that will not occur until far in the future, for instance, appending additional material to the playlist, can indefinitely delay edits to events that will occur sooner. This can result in lost edits or erroneous execution of the playlist.

SUMMARY OF THE INVENTION

In an exemplary embodiment of the invention, a software component called a "throttler" allows playlist loads and edits to be interleaved with other actions such as sending commands to devices and interacting with an operator. External components that load and edit the playlist send editing commands. Each command represents either an insertion or a deletion of an event. Modification to an existing event is expressed as a deletion of the existing event, followed by an insertion of the modified event. Every event has a unique "event identifier" which points to a rapidly accessible data structure of command pairs of insertion and deletion edits for that event, ordered by urgency.

The interleaving of commands has a number of advantages over the state of the art systems. First, it allows the video devices to receive an incomplete schedule immediately, and begin executing it even while later events in the playlist are still being processed. By delivering the events that are close to air, it allows the system to go on air sooner than if the entire playlist had to be loaded before any video actions could begin. Second, it allows the video devices to report on the status of events in the playlist even before the download of the playlist is complete, allowing the system to capture a timely record of the video that actually played for purposes such as accounting and fault analysis. Third, it allows the operator interface to remain "live" during the initial download of commands to the video equipment. The operator can determine the status of equipment, view the complete or incomplete playlist, interact with the devices, and request edits to the playlist, even while the initial download is proceeding.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
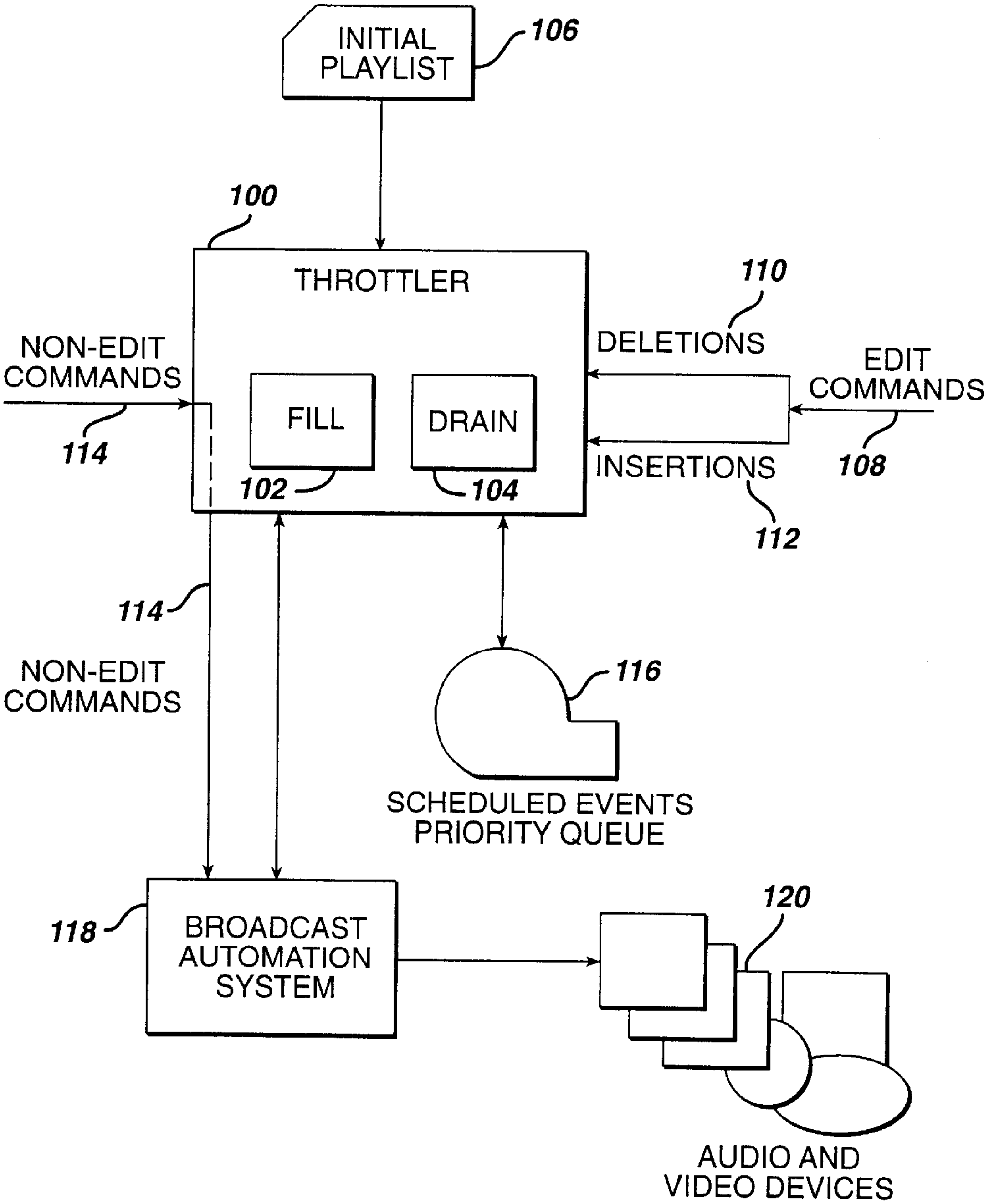
FIG. 1 is a high level data flow diagram of the throttler, as connected to a broadcast automation system.

Referring to the drawings, and more particularly to FIG. 1, the data flow of commands and edits through a preferred embodiment of the throttler is shown. The throttler 100 loads the initial playlist 106 while also accepting edit commands 108. Non-edit commands 114 are received by the throttler 100 and passed directly to the broadcast automation system 118 which typically resides on the same CPU as the throttler, or at least has a device driver on the same CPU as the throttler to allow communication between the two processes. Using the method described below, the throttler 100 interleaves these events and edit commands and generates and modifies the playlist of scheduled events 116. The throttler 100 sends the events to the broadcast automation system 118 for execution which drives the audio and video devices 120 based on the scheduled events. The throttler periodically yields the central processor so that time is available for other processes to handle non-edit commands, such as operator query of the playlist, direct operator command of the devices, and status reporting from the devices. The throttler is best practiced with a broadcast automation system which reads a playlist, as formatted and communicated by the throttler and reformats, if necessary, and then forwards the edit and non-edit commands to a number of audio, video or other device drivers for managing the broadcast automation. The preferred broadcast automation system also displays status of the scheduled events and allows some manual modification by an operator through a user interface.

For each editing command 108 that has not been processed by the throttler 100, up to two pieces of information are maintained: one deletion command and one insertion command. Either command may be omitted. Each command, or event, has a unique "event identifier."

When the throttler 100 accepts a deletion command 110, if any prior command applying to the same event identifier, either insertion or deletion, has not been processed, it is discarded, and the newly-accepted deletion command alone is retained. When the throttler 100 accepts an insertion command 112, any previous insertion command that applies to the same event identifier is discarded, but any previous deletion command is retained.

Figure 2:
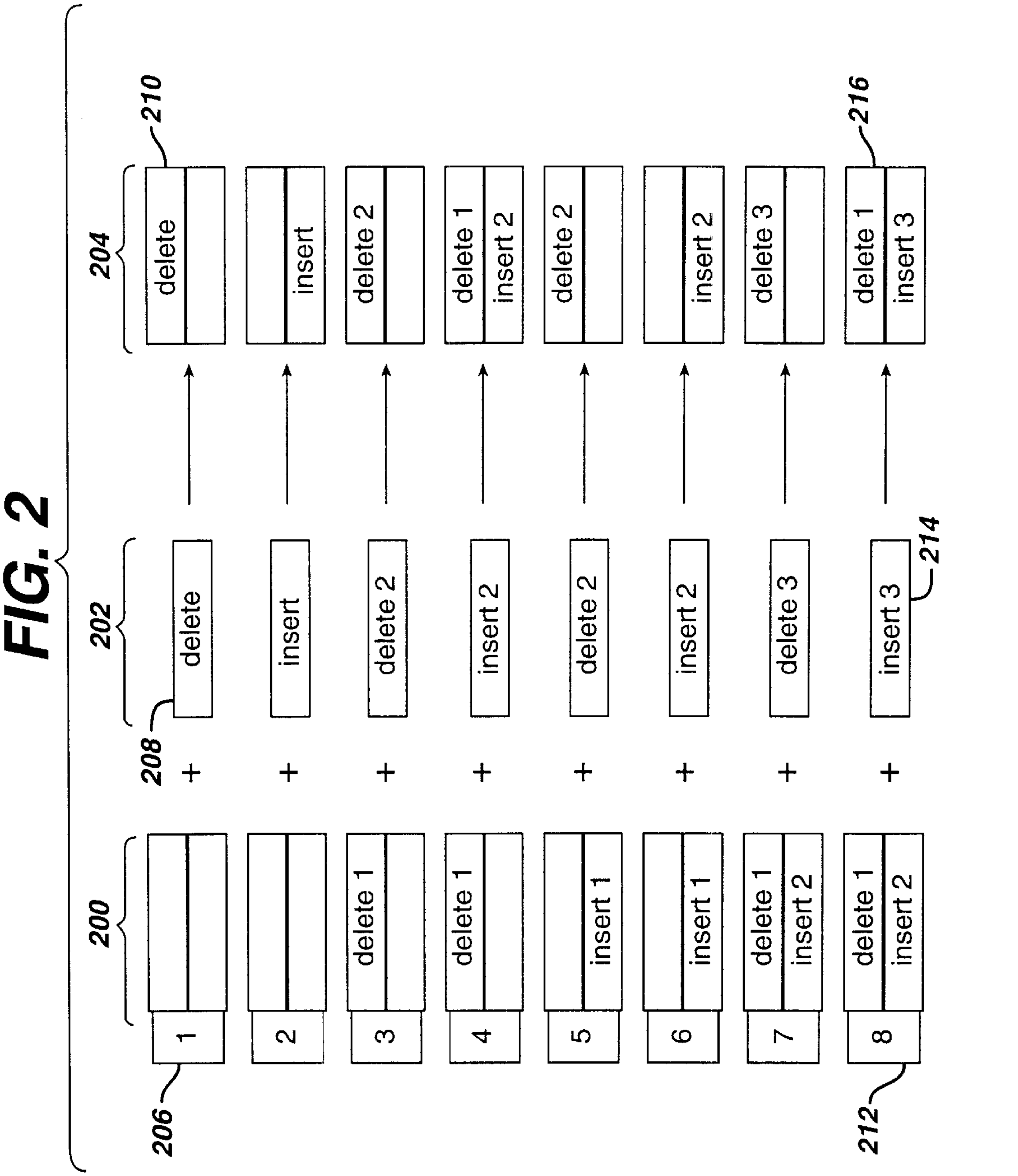
FIG. 2 is an illustration of rules for accumulating deletion and insertion commands.

FIG. 2 illustrates the rules for accumulating deletion and insertion commands. The first column 200 shows the two possibilities for existing insertion and deletion commands for an event scheduled in a playlist. The second column 202 shows the newly accepted command, and the third column 204 shows the resulting command structure for that event. For instance, if event one 206 has no scheduled insertion or deletions and a deletion command 208 is accepted, the resulting scheduled event is a deletion 210 for this event. Event eight 212 has a deletion and an insertion already scheduled. If a new insertion command for this event is accepted 214, then the result 216 is to retain the deletion command and substitute the newly received insertion command and discard the original insertion command. It can be seen by FIG. 2 that the throttler always maintains the minimal set of changes needed to make the events in the automation system correspond with the desired set of events. The command pairs 200 and 204, in turn, are organized into a "priority queue" which is a data structure that allows rapid search for the element of the least value. The ordering of the pairs is defined by the scheduled execution times of the events. If there are both deletion and insertion commands, the earlier of the scheduled times of the deleted and inserted copy of the event determines the precedence of the pair. This scheme orders the commands by their relative urgency, while still preserving the fact that the old copy of the event must be deleted before the new one is inserted.

The priority queue data structure chosen has the attribute that elements of the queue, once inserted, do not change memory location. The fact that memory locations are kept stable allows the hash table to be maintained as a distinct data structure from the priority queue. Were queue elements to change their position in memory, the hash table would have to be updated every time one was moved, necessitating either another search of the table or else maintenance of a pointer to the hash table element inside the priority queue element, and complicating the programs that maintain the queue. The priority queue data structure also allows rapid deletion of an element from any position in the queue. These restrictions mean that a heap, a sorted vector, or a B-tree would be inappropriate data structures. The preferred embodiment uses a "leftist tree," which is a structure well known to those skilled in the art, to organize the priority queue. A more complete description of this data structure may be found in *The Art of Computer Programming, Volume 3: Sorting and Searching*, by D. E. Knuth (Reading, Mass.: Addison-Wesley 1973 pp. 149–153, 159, 619–620). The leftist tree has the advantage that its performance is faster for operations near the front of the queue. This property makes it preferable to alternative implementations that use AVL trees, splay trees, or similar self-organizing data structures.

Figure 3:
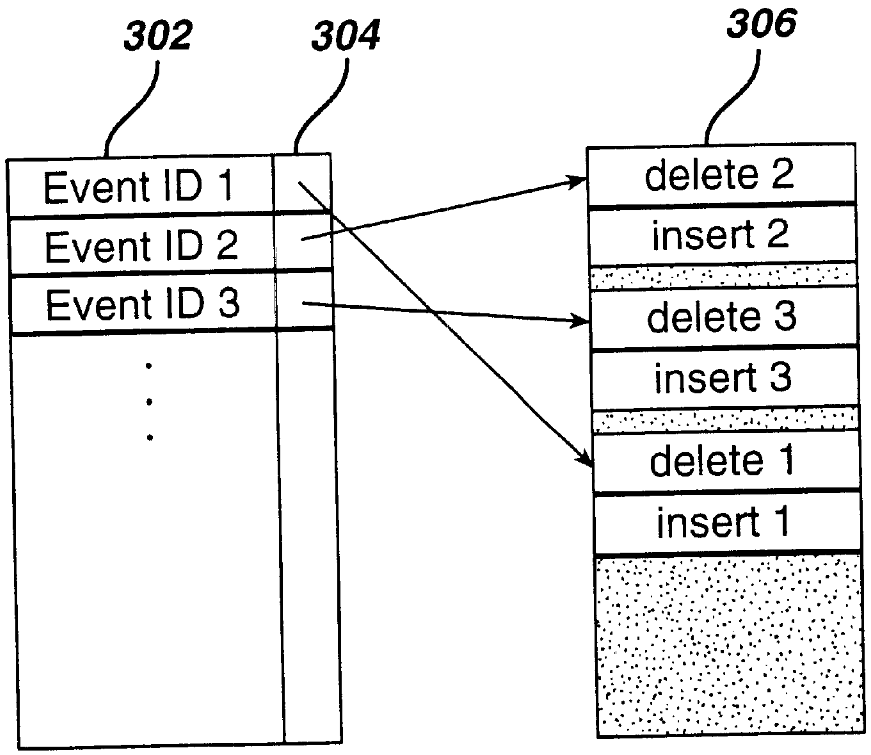
FIG. 3 shows a representation of the data structures used in the throttler.

The priority queue is augmented with a hash table, which is also a data structure well known in the art. The hash table maps event identifiers to the address of the queue elements as shown in FIG. 3. This structure is used to locate the delete-insert pair when a new command arrives. Referring to FIG. 3, each Event Identifier 302 has a pointer 304 associated with it that maps by hashing into the queue elements of delete-insert pairs 306.

The algorithms used in the throttler comprise two processes: "Fill" and "Drain." The Fill process accepts commands rapidly using the method of FIGS. 4 and 5. The Drain process mediates delivering commands in a way that allows the broadcast automation system to continue to perform other tasks, such as device control and operator interface, even as new commands are arriving, according to the method of FIG. 6.

Figure 4:
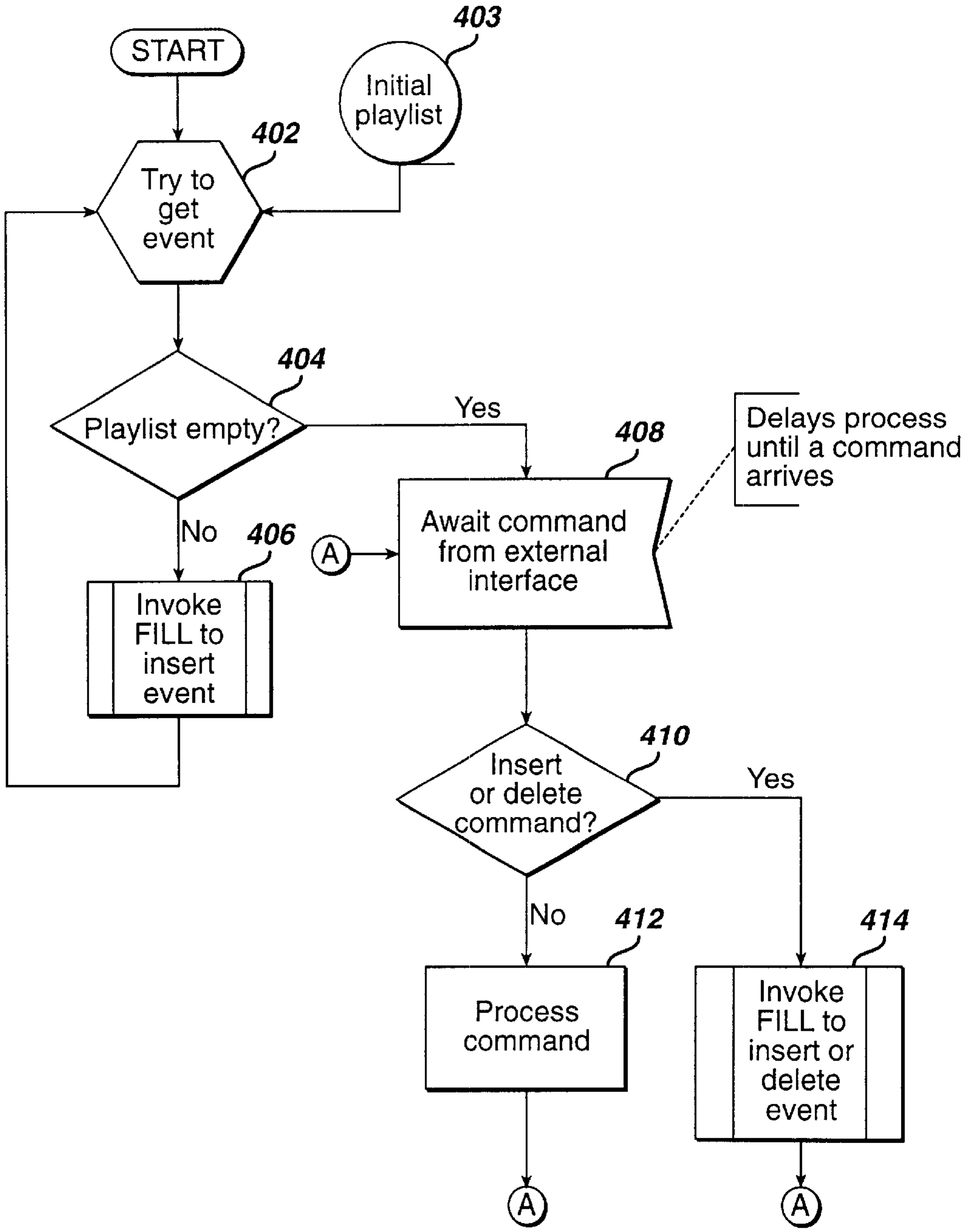
FIG. 4 is a flow diagram of the method of the throttler's main process.

Referring to FIG. 4, the initial load of the playlist reads in the events from the initial playlist 403 in function block 402. If there is another event on the playlist, as determined in decision block 404, then the priority queue and hash table are populated by the Fill process, to be described below, in function block 406. This process continues until all initial events have been loaded into the priority queue. These operations are time inexpensive operations compared with sending the events to the devices, as is done by the broadcast automation system. Once the initial priority queue is constructed, the Fill process awaits commands from its external interface (e.g. other programs, the operator, and the devices) in function block 408.

Figure 5:
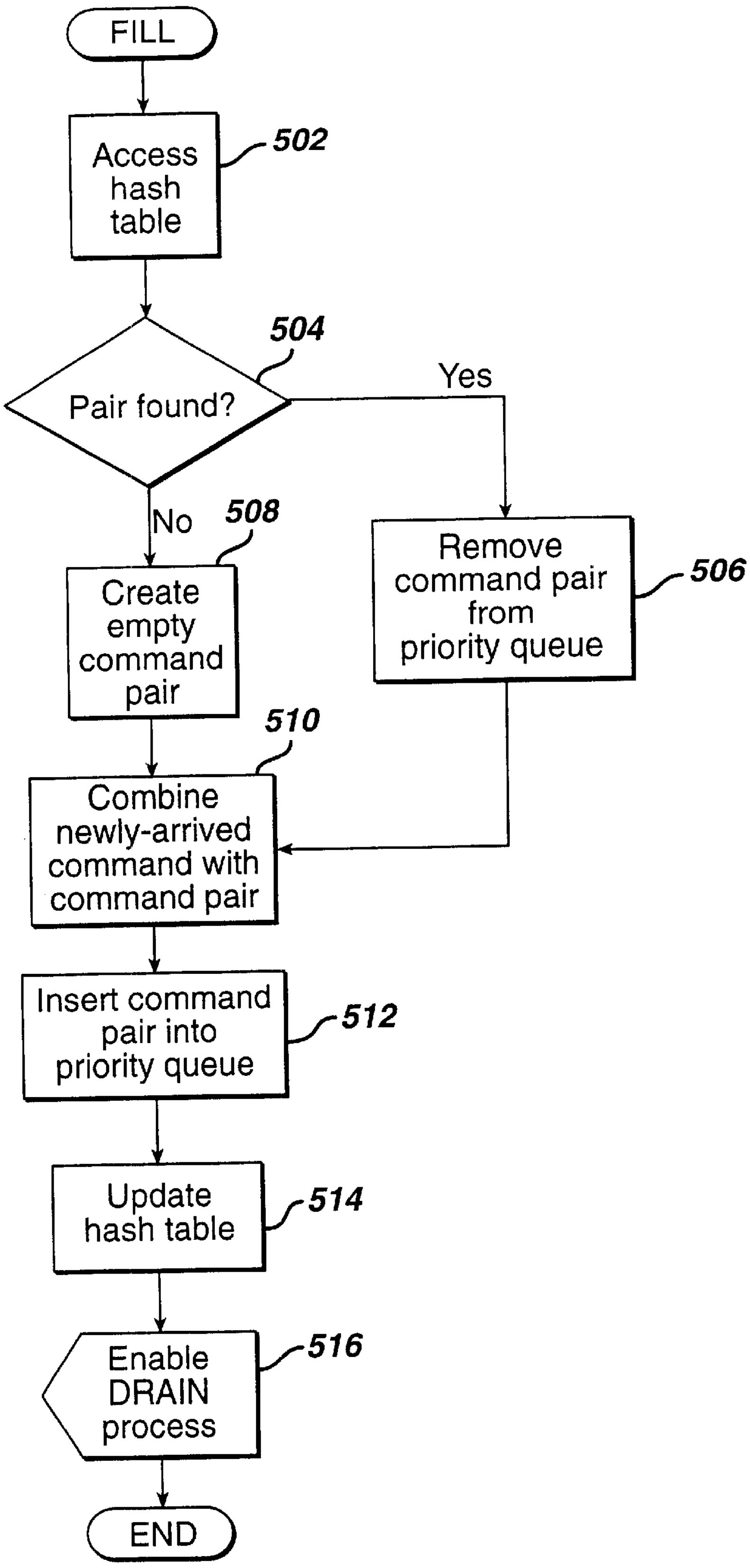
FIG. 5 is a flow diagram of the method of the throttler's Fill process.

Each newly received command is checked to determine whether it is an edit command in decision block 410. If it is not an edit command then it is directed to the correct component of the system and processed in function block 412. Otherwise, the playlist must be edited by adding the new command and updating the priority queue and hash table by calling the Fill command in function block 414. Referring to FIG. 5, for each command accepted by the throttler the Fill process first accesses the hash table to find any pre-existing command pair for the event being edited in function block 502. If a pre-existing pair is found in decision block 504, it is removed from the priority queue for processing in function block 506. Otherwise, a new, empty, command pair is created for processing in function block 508. The newly arrived command is then combined with the command pair according to the rules as shown in FIG. 2.

The command pair is inserted into the priority queue in function block 512, ensuring that it will be ordered correctly according to urgency. Finally, the hash table is updated to reflect the new address of the priority queue entry in function block 514. The Drain process, as described below, is re-enabled in function block 516.

The Fill process normally takes precedence over the other processes in the system. Because its tasks are only to maintain the hash table and priority queue, it normally consumes only an insignificant fraction of the total central processor unit (CPU) time, and no precautions to keep it from locking out other processes are required.

The Drain process is usually enabled by the broadcast automation system to retrieve commands at a certain minimum time interval, calculated to leave it enough time for its other tasks. An alternative method would allow commands with less than a specified time to completion to be forced through, even if sending these events to the broadcast automation system would temporarily "freeze" the operator interface, delay the reporting of status of earlier events, postpone the acceptance of non-edit commands, or otherwise temporarily result in undesirable postponement of less urgent tasks. The Drain process consists of an endless loop.

The Drain process typically communicates with a "device driver" process to control when it is enabled. The control for when it is enabled can be extremely simple; often it is a simple timer interrupt that causes it to be enabled a certain number of milliseconds after processing its last command or a certain number of milliseconds after the device presents a "clear to send" indication. The range of time delays that will result in acceptable performance is normally quite wide. Too short a time delay will overload the CPU and result in undesirable postponement of other processes, while too long a time delay will cause events to reach the devices after their scheduled times, as could happen in the method of FIG. 6, or always be processed as "urgent" events, as in the alternate method of FIG. 7. Normal workloads in a system capable of handling eight channels of video indicate that delays in the range of a few hundred milliseconds to a few seconds all result in acceptable performance.

Figure 6:
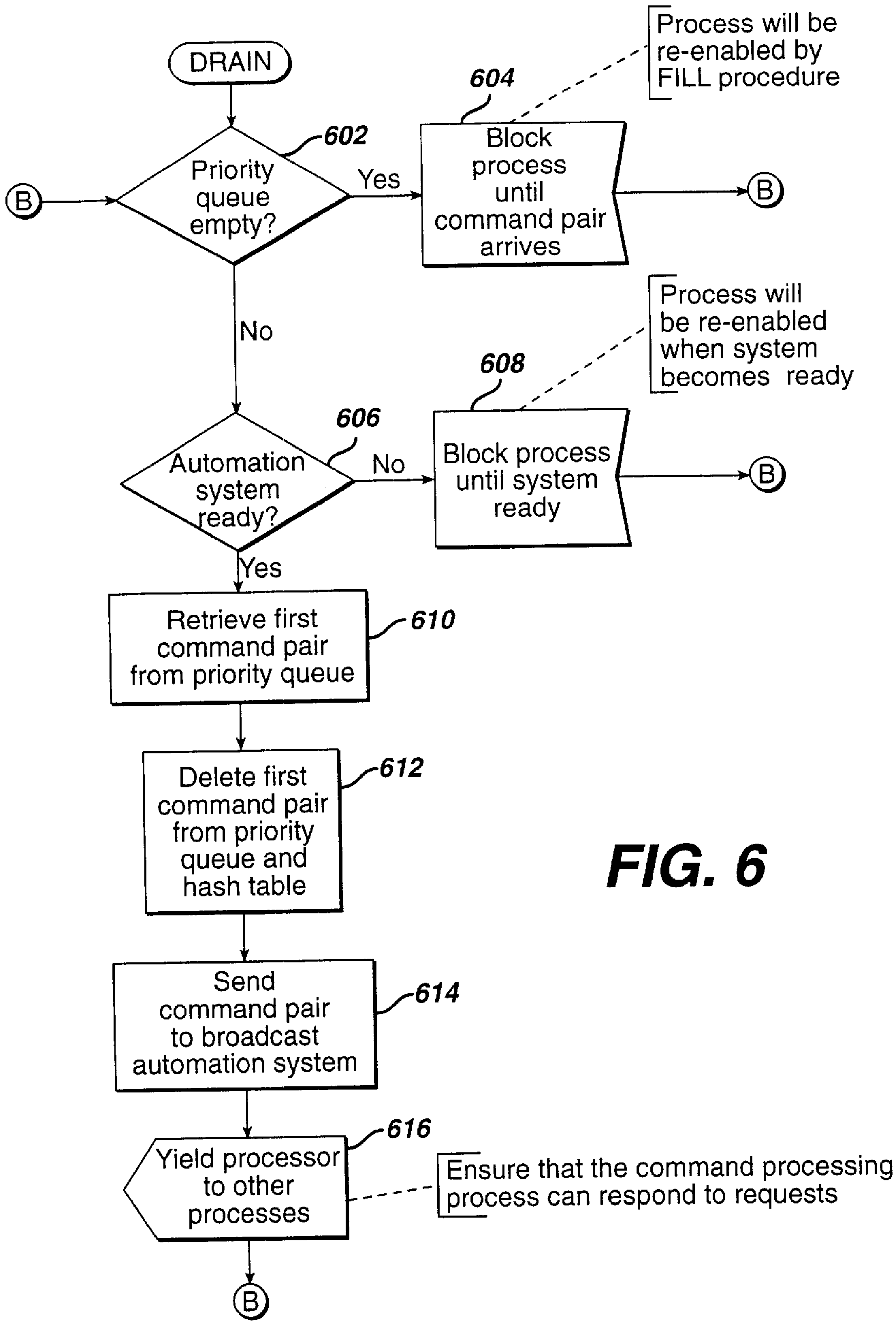
FIG. 6 is a flow diagram of the method of the throttler' Drain process.

Referring now to FIG. 6, the simple Drain process is shown. First, the priority queue is checked to determine whether there are command pairs in the priority queue in decision block 602. If the is queue is empty, then the process is blocked until a command pair arrives in function block 604. The Drain process waits until the Fill process re-enables it, as shown in FIG. 5, function block 516. Otherwise, a check is made to determine whether the automation system is ready to accept a new command in decision block 606. If not, the Drain process is blocked, and is re-enabled when the system is ready to accept more commands.

When there are events to remove from the priority queue and the system is ready to receive them, the first command pair is retrieved from the queue in function block 610. When a command pair has been retrieved, it is deleted from the priority queue, and its corresponding entry in the hash table is also deleted in function block 612. The command pair is presented to the broadcast automation system in function block 614. Once the command pair has been successfully sent, the process yields the CPU to other processes, in function block 616, to ensure that the command processing process can respond to requests and then continues again in decision block 602 to process additional command pairs from the priority queue.

Figure 7:
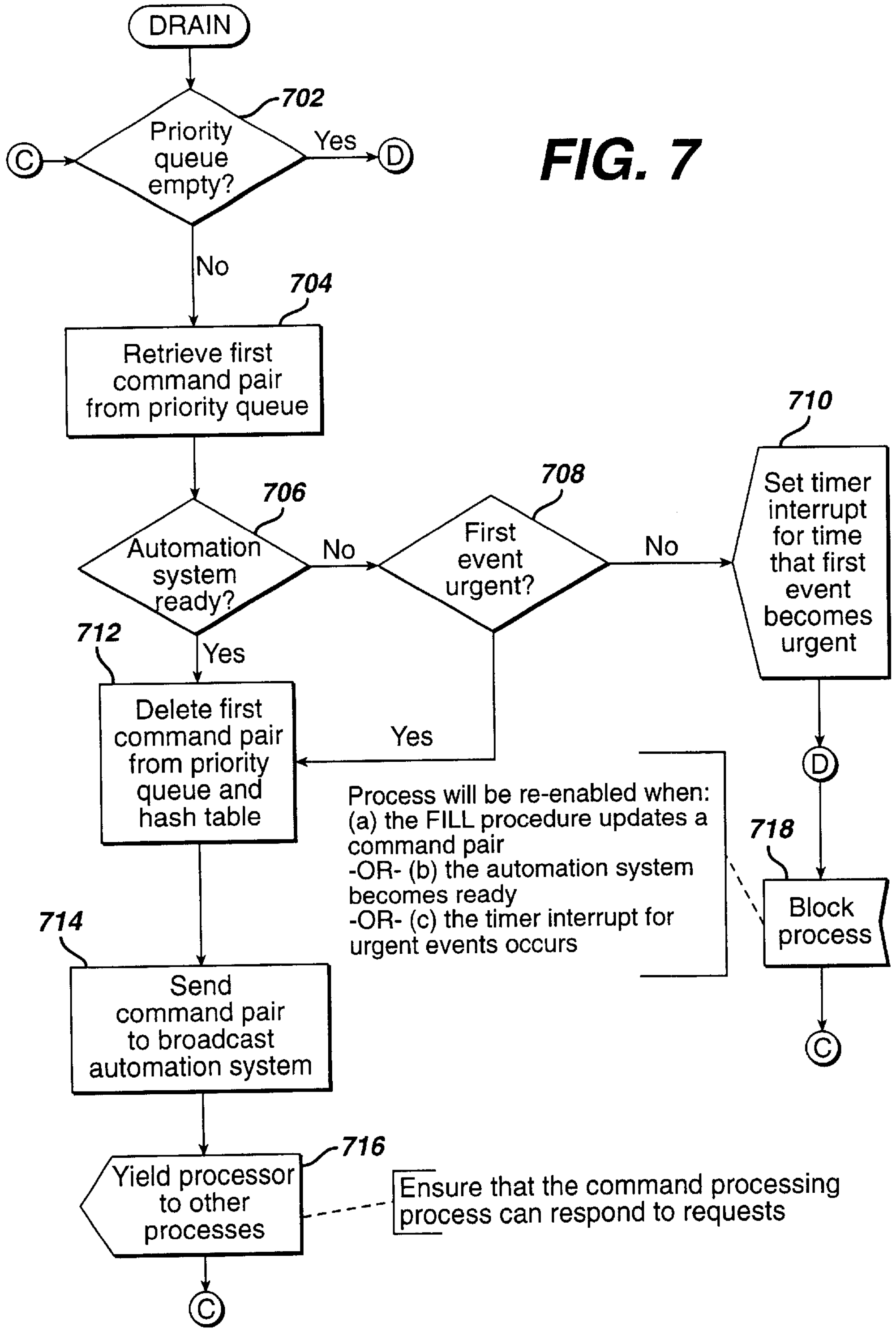
FIG. 7 is a flow diagram of the alternate method of the throttler's Drain process used for urgent commands.

An alternate method which ensures timely processing of urgent commands is shown in FIG. 7. This process is similar to the simple Drain process. First, the priority queue is checked to determine whether there are command pairs in the priority queue in decision block 702. If the is queue is empty, then the process is blocked until either a command pair arrives, the automation system becomes ready, or the time interrupt for urgent events occurs in function block 718. Otherwise, if the queue is not empty, the first command pair is retrieved from the queue in function block 704. A check is made to determine whether the automation system is ready to receive a new command in decision block 706. If it is not ready, a test is performed to determine whether the command is urgent in decision block 708. If it is not urgent, then the timer interrupt is set for a time when the first event becomes urgent in function block 710. The Drain process is again blocked as described above in function block 718. If the command is urgent, as determined in decision block 708, or the automation system was ready to receive a command, as determined in decision block 706, the command pair is deleted from the priority queue, and its corresponding entry in the hash table is also deleted in function block 712. The command pair is then presented to the broadcast automation system in function block 714. Once the command pair has been successfully sent, the process yields the CPU to other processes, in function block 716, to ensure that the command processing process can respond to requests and then continues again in decision block 702 to process additional command pairs from the priority queue.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A throttler used for rapid start-up of a broadcast automation system comprising:

means for loading a playlist containing a schedule of events;

means for accepting a plurality of editing and non-editing commands;

means for interleaving the acceptance of said editing commands with said non-editing commands; and means for presenting said editing commands and non-editing commands and said playlist to said broadcast automation system, wherein said presenting means presents said editing commands, non-editing commands and playlist in a manner that permits said broadcast automation system to interleave the processing of said editing commands and non-editing commands with execution of the playlist.

2. A throttler as recited in claim 1, wherein said editing commands are either insertion or deletion commands.

3. A throttler as recited in claim 2, wherein each event in the playlist comprises a command pair of no more than one insertion command and no more than one deletion command and a unique event identifier.

4. A throttler as recited in claim 3, wherein each of said command pairs is stored in a rapidly accessible priority queue ordered by urgency of each event in said playlist.

5. A throttler as recited in claim 4, wherein each of said command pairs is addressable by either said event identifier or as a lead element in said priority queue.

6. A throttler as. recited in claim 5, wherein said priority queue allows deletion of a command pair identified by said event identifier anywhere within said priority queue.

7. A throttler as recited in claim 1, wherein said interleaving means comprises:

means for accepting editing commands, and means for draining commands by mediating delivery of said accepted editing commands to said broadcast automation system.

8. A method for throttling commands for rapid start-up of a broadcast automation system, said method comprising the steps of:

loading a playlist containing a schedule of events;

receiving commands from external interfaces;

determining whether said received commands are editing or non-editing commands;

forwarding non-editing commands to said broadcast automation system;

filling and rescheduling said playlist with said editing commands; and draining said rescheduled playlist of editing commands to said broadcast automation system in a manner that permits said broadcast automation system to interleave the processing of said editing commands and non-editing commands with execution of the playlist.

9. A method for throttling commands as recited in claim 8, wherein said draining step may interrupt said filling step.

10. A method for throttling commands as recited in claim 8, wherein said filling step or said broadcast automation system enable said draining step.

11. A method for throttling commands as recited in claim 8, wherein said editing commands are either insertion or deletion commands.

12. A method as recited in claim 11, wherein each event in the playlist comprises a command pair of no more than one insertion command and no more than one deletion command and a unique event identifier.

13. A method as recited in claim 12, wherein each of said command pairs is stored in a rapidly accessible priority queue ordered by urgency of each event in said playlist.

14. A method as recited in claim 13, wherein each of said command pairs is addressable by either said event identifier or as a lead element in said priority queue.

15. A method as recited in claim 14, wherein said priority queue allows deletion of a command pair identified by said event identifier any where within said priority queue.

* * * * *